(12) United States Patent
Freeman et al.

(10) Patent No.: US 6,496,184 B1
(45) Date of Patent: Dec. 17, 2002

(54) METHOD FOR INFERRING SCENES FROM TEST IMAGES AND TRAINING DATA USING PROBABILITY PROPAGATION IN A MARKOV NETWORK

(76) Inventors: William T. Freeman, 16 Half Moon Hill, Acton, MA (US) 01720; Egon C. Pasztor, 15 Forster St., Apt. 2, Somerville, MA (US) 02145; Baback Moghaddam, 15 Bigelow St. #5, Cambridge, MA (US) 02139

( * ) Notice: Subject to any disclaimer, the term of this patent is extended or adjusted under 35 U.S.C. 154(b) by 0 days.

(21) Appl. No.: 09/335,943

(22) Filed: Jun. 18, 1999

Related U.S. Application Data

(63) Continuation-in-part of application No. 09/236,839, filed on Jan. 25, 1999, which is a continuation-in-part of application No. 09/203,108, filed on Nov. 30, 1998.

(51) Int. Cl.[7] ............................................... G06T 15/00
(52) U.S. Cl. ...................... 345/419; 345/473; 348/699; 348/700; 382/173
(58) Field of Search .................................. 345/419, 418, 345/473, 474, 433; 348/700, 699, 416.1; 382/236, 276, 284, 154, 107, 173

(56) References Cited

U.S. PATENT DOCUMENTS 5,784,114 A * 7/1998 Borrer et al. ................ 348/452
5,940,145 A * 8/1999 Burl ............................ 348/699
5,963,670 A * 10/1999 Lipson et al. ................ 382/224
6,097,854 A * 8/2000 Szeliski et al. .............. 382/284
6,141,019 A * 10/2000 Roseborough et al. ...... 345/473
6,151,424 A * 11/2000 Hsu ............................. 382/294

OTHER PUBLICATIONS

Carlo S. Regazzoni and Vittorio Murino; Multilevel GMRF-based segmentation of image sequences 1992; University of Genova, Genova, Italy, IEEE, May 1992; pp 713–716.*

* cited by examiner

Primary Examiner—Mark Zimmerman
Assistant Examiner—Huedung X. Cao

(57) ABSTRACT

A method infers a scene from a test image. During a training phase, a plurality of images and corresponding scenes are acquired. Each of the images and corresponding scenes are partitioned respectively into a plurality of image patches and scene patches. Each image patch is represented as an image vector, and each scene patch is represented as a scene vector. The image vectors and scene vectors are modeled as a network. During an inference phase, the test image is acquired. The test image is partitioned into a plurality of test image patches. Each test image patch is represented as a test image vector. Candidate scene vectors corresponding to the test image vectors are located in the network. Compatibility matrices for the candidate scene vectors are determined, and probabilities of the compatibility matrices are propagated in the network until convergence to infer the scene from the test image.

25 Claims, 7 Drawing Sheets

METHOD FOR INFERRING SCENES FROM TEST IMAGES AND TRAINING DATA USING PROBABILITY PROPAGATION IN A MARKOV NETWORK

CROSS-REFERENCE TO RELATED APPLICATION

This is a Continuation-in-Part Appplication of Continuation-in-Part application Ser. No. 09/236,839 filed Jan. 25, 1999 "Estimating Targets Using Statistical Properties of Observations of Known Targets," by Freeman et al., which is a Continuation-in-Part of Parent U.S. patent application Ser. No. 09/203,108 filed Nov. 30, 1998 "Using Estimating Scenes Using Statistical Properties of Images and Scenes," by Freeman et al.

FIELD OF THE INVENTION

This invention relates generally to processing digital signals, and more particularly, to inferring scenes from test images.

BACKGROUND OF THE INVENTION

One general problem in digital signal processing is how to infer the overall characteristics of some real world signal from isolated instances or degraded signal samples. For example, in vision applications, some part of a real world scene is measured by acquiring one or more images. For motion estimation, the input is usually a temporally ordered sequence of images, e.g., a "video." The problem is how to estimate the projected velocities of various objects, e.g., people, cars, balls, or background, moving in the video. Another vision application deals with recovering real-world three-dimensional structure from two-dimensional images. For example, how to recover the shape of an object from a line drawing, a photograph, or a stereo pair of photographs. Yet another problem is how to recover high-resolution details from low-resolution signals. For example, how to produce high-resolution details from a low-resolution image, or how to provide a high-resolution audio signal on a noisy transmission line.

Humans make these types of estimates all the time, frequently subconsciously. There are many applications for machines to be able to do this also. These problems have been studied by many workers with different approaches and varying success for many years. The problem with most known approaches is that they lack machine learning methods that can exploit the power of modem processors and memory capacities within a general framework.

In the prior art, methods have been developed for interpreting blocks of world images. Other prior art work, using hand-labeled scenes, has analyzed local features of aerial images based on vector codes, and has developed rules to propagate scene interpretations. However, these solutions are for specific one-step classifications, and therefore, cannot be used for solving a general class of low-level vision problems. Methods to propagate probabilities have been used, but these methods have not been put in a general framework for solving vision problems.

Alternatively, optical flow can be estimated from images by using a quad-tree to propagate motion information across scale. There, a brightness constancy assumption is used, and probabilities about the velocity of the optical flow is presented as a Gaussian probability distribution, both of which limit the generality of that approach.

U.S. patent application Ser. No. 09/203,108 "Estimating Scenes Using Statistical Properties of Images and Scenes," by Freeman et al., uses probability densities modeled as a mixture of Gaussian distributions to make scene estimates. In a Continuation-in-Part application Ser. No. 09/236,839 "Estimating Targets Using Statistical Properties of Observations of Known Targets," by Freeman et al., the estimation is done by a combination of probability densities and vectors. The problem with these prior art techniques is that Gaussian mixtures consume substantial time and storage during processing and give a poor approximation to the probability density. It is desired to improve over these prior art techniques.

SUMMARY OF THE INVENTION

The invention provides a method for inferring a scene from a test image.

During a training phase, a plurality of labeled images and corresponding scenes are acquired. Each of the images and corresponding scenes is partitioned respectively into a plurality of image patches and scene patches.

Each image patch is represented as an image vector, and each scene patch is represented as a scene vector. The probabilistic relationship between the image vectors and scene vectors is modeled as a network. The probabilistic relationship between the image vectors and scene vectors is modeled as a network, preferably a Markov network.

During an inference phase, the test image corresponding to an unknown scene is acquired. The test image is partitioned into a plurality of test image patches. Each test image patch is represented as a test image vector. Candidate scene vectors corresponding to the test image vectors are located in the training data. Compatibility matrices for candidate scene vectors at neighboring network nodes are determined, and probabilities are propagated in the network until a predetermine termination condition is reached to infer the scene from the test image. The termination condition can be some level of convergence or a fixed number of iterations.

DETAILED DESCRIPTION OF PREFERRED EMBODIMENTS

Figure 1:
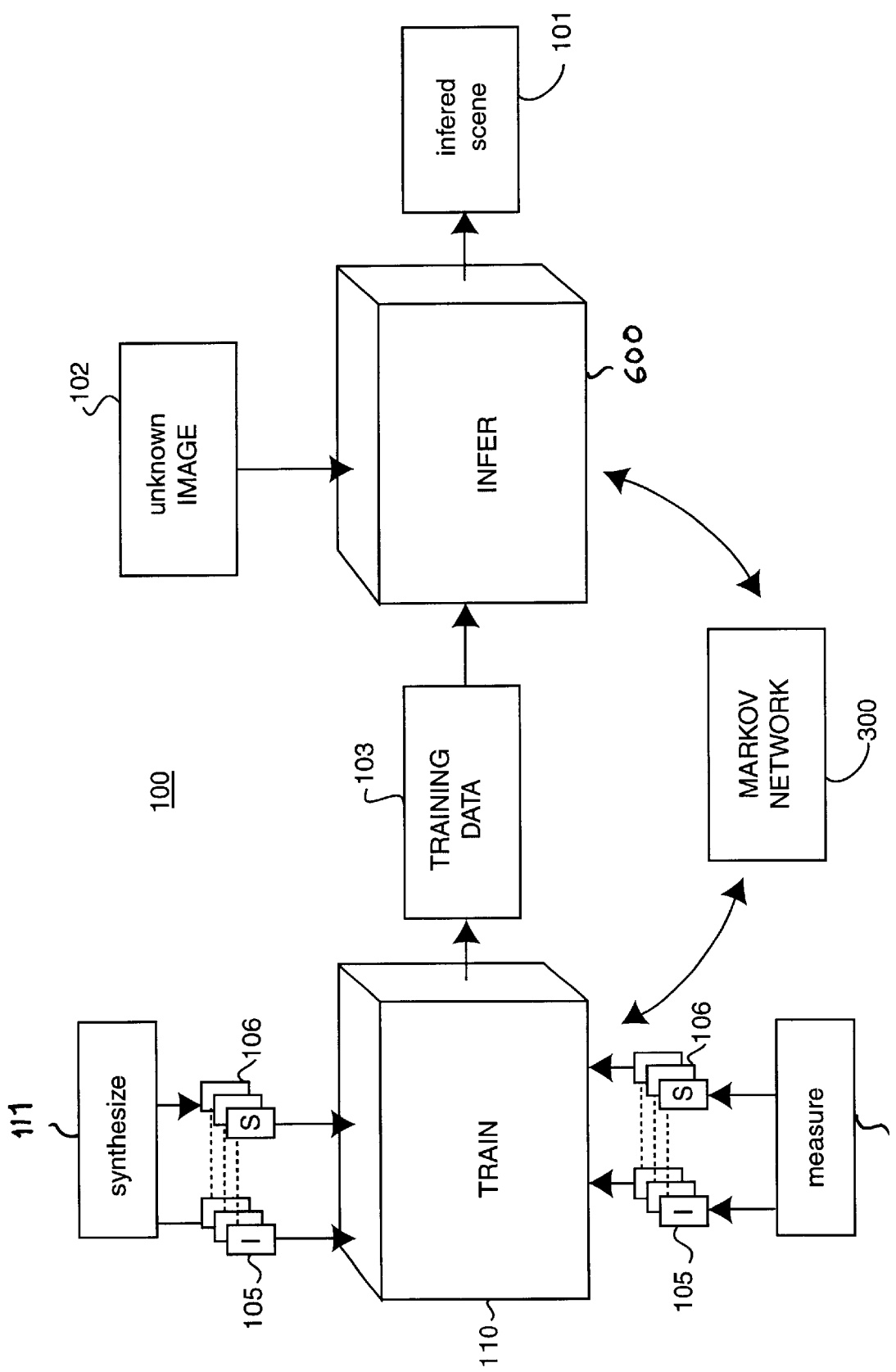
FIG. 1 is a flow diagram of an inference system according to the invention.

FIG. 1 shows a system 100 for inferring a scene 101 from an observation 102 and labeled training data 103 (labeled signals) using probability propagation in a Markov network 300. The system 100 according to our invention has two major phases: training 110, and inferring 600. Hereinafter, we call the observations "images."

Although, in describing our invention, we use terms that are most often associated with the visual world, it should be understood, that our invention can be used with any type of observation, e.g., two-dimensional image signals, one-dimensional audio signals, or signals of other dimensionality not necessarily graphic and video images.

When we use the term "scene," we mean an accurate and detailed representation of real world objects, scene, phenomena, or comparable synthetic models. When we use the term "image," we mean measurements responsive to the underlying scene, or some degraded or less detailed measurement or instance of the underlying scene. For example, in the field of vision, the scene can be represented by a scene description which includes accurate and detailed geometries of objects, shading, lighting, and other rendering parameters which may vary over space and time. An image is a two-dimensional representation of the scene as would be rendered by a camera. In the field of audio, the scene might be a recording obtained under near perfect acoustic conditions, an audio image is the result of transmitting that high-fidelity recording over a low grade telephone line which distorts audio signal, and introduces noise.

Training Phase

During training, we acquire images (I) 105 and corresponding scenes (S) 106. The labeled scenes and images can be acquired by synthesis 111 or measurement 112. The scenes and images acquired during training should be somewhat typical of test images to be processed by the system 100.

We break the acquired images and scenes into overlapping pieces we call "patches." A typical set of labeled training data includes about 20,000 to 40,000 pairs of patches. The actual representation used for the patches is application specific. For vision-related applications, the patches can be two-dime dimensional, and for audio applications the patches can be one-dimensional. Volumetric data set can use three-dimensional patches.

The patches can be composed of data samples, or of values derived from the samples, such as a multi-resolution pyramid, or filter outputs, or other derived values.

Figure 2:
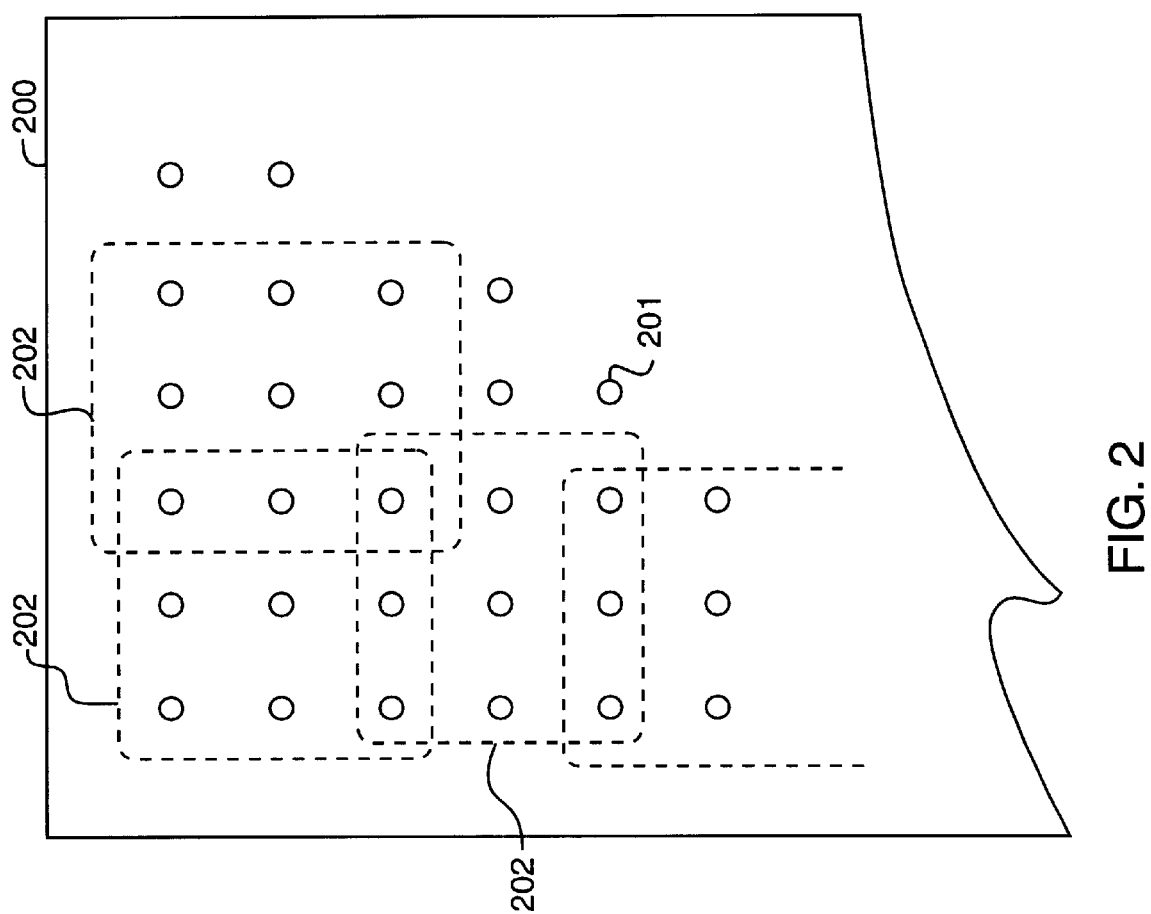
FIG. 2 is a block diagram of an image partitioned into patches.

FIG. 2 shows a portion of one acquired image 200 for an example vision application. Open circles 201 represent intensity values or pixels. The overlapping patches 202 are shown by dashed lines. The size of the patches can range from 3×3 to 9×9 pixels. Other sizes can also be used, and the size of the patches in the images can be different than the size of the patches in the corresponding scenes.

All patches of a given set of criteria, such as resolution and orientation, but differing spatially, or for some applications temporally, are said to be of the same class, and are assumed to be drawn from the same statistical distribution. The sizes of the patches are small enough to allow modeling, yet large enough to convey meaningful information about the overall scene.

Principle components analysis (PCA) can be used to determine a representation for each patch. For example, each patch is expressed as a linear combination of basis functions. According to the present invention, we prefer to represent the patches 202 as a low-dimensional vector. For example, each scene patch can be represented as a five-dimensional vector, and each image patch as a seven-dimensional vector. In other words, we represent the patches derived from the acquired scenes and images respectively as points in a five-dimensional and a seven-dimensional space.

Figure 3:
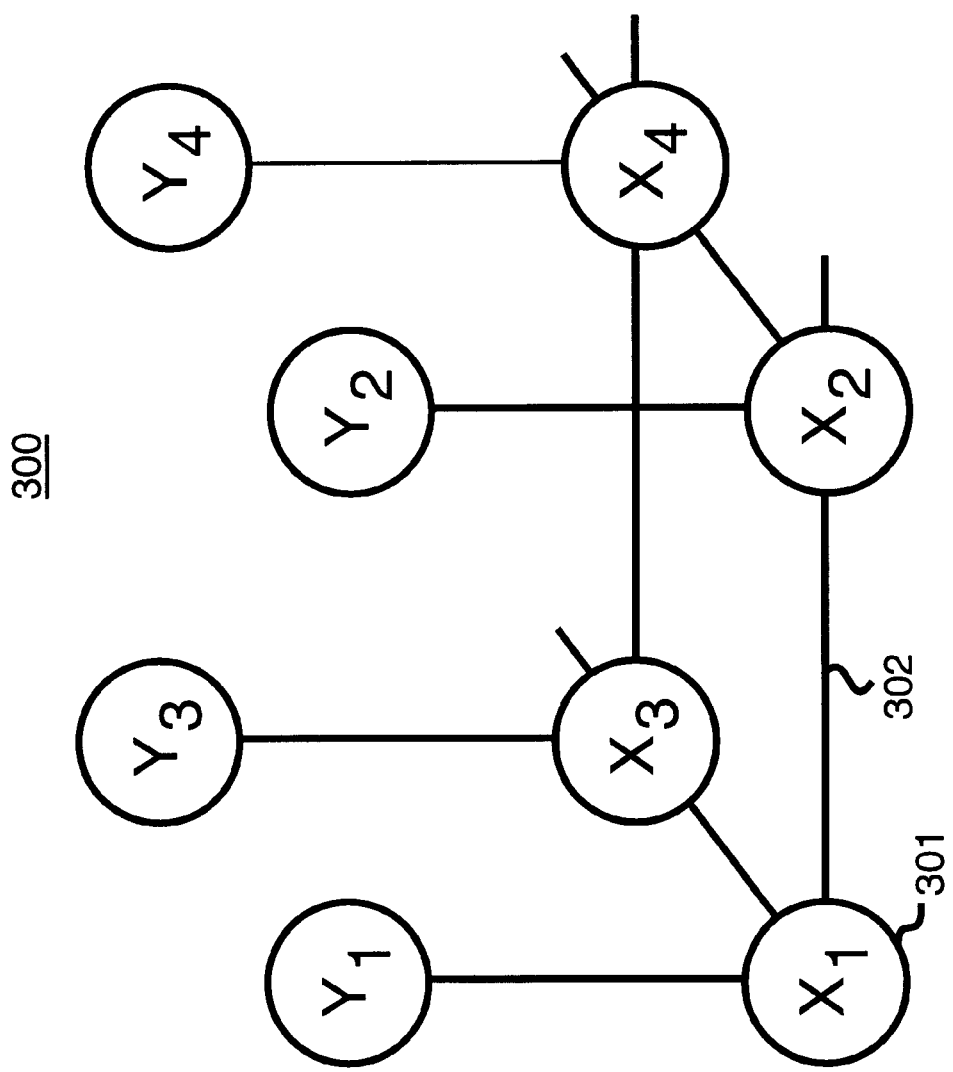
FIG. 3 is a diagram of a Markov network.

As shown in FIG. 3, each vector is modeled as a node 301 in a Markov network 300. In the network 300, nodes labeled $X_i$ model the low-dimensional vectors for scene patches, and the nodes labeled $Y_r$ model the vectors for the corresponding image patches. The edges 302 connecting the nodes model the statistical dependencies between the nodes 301. As described in greater detail below, we express the linking statistical dependencies as compatibility matrices in the present invention. In the network as shown, there is a one-to-one correspondence between image and scenes, although it should be understood that the network can also accommodate many-to-one correspondences.

The network 300 can be modeled as a multi-resolution representation, such as a Gaussian pyramid. The pyramid can have, for example, three levels of resolution—fine, medium, and coarse. If a Gaussian pyramid is used, then nodes at a given resolution level can be connected to spatially neighboring nodes at the same level as well as to nodes at the same spatial position in an adjacent resolution level. Furthermore, connections can be made to scene elements varying in some other dimension, such as filter orientation. For one-dimensional signals, e.g., motion data over time or audio data, the network 300 of nodes is a chain connected along the dimension of time.

During the inference phase, these connections assist in removing spatial artifacts while inferring scenes from test images. The connected Markov network 300 allows each scene node to update its probability based on accumulated local evidence gathered from other nodes during the inference phase. The probability is the combined probability that will form the final best estimate.

Figure 4:
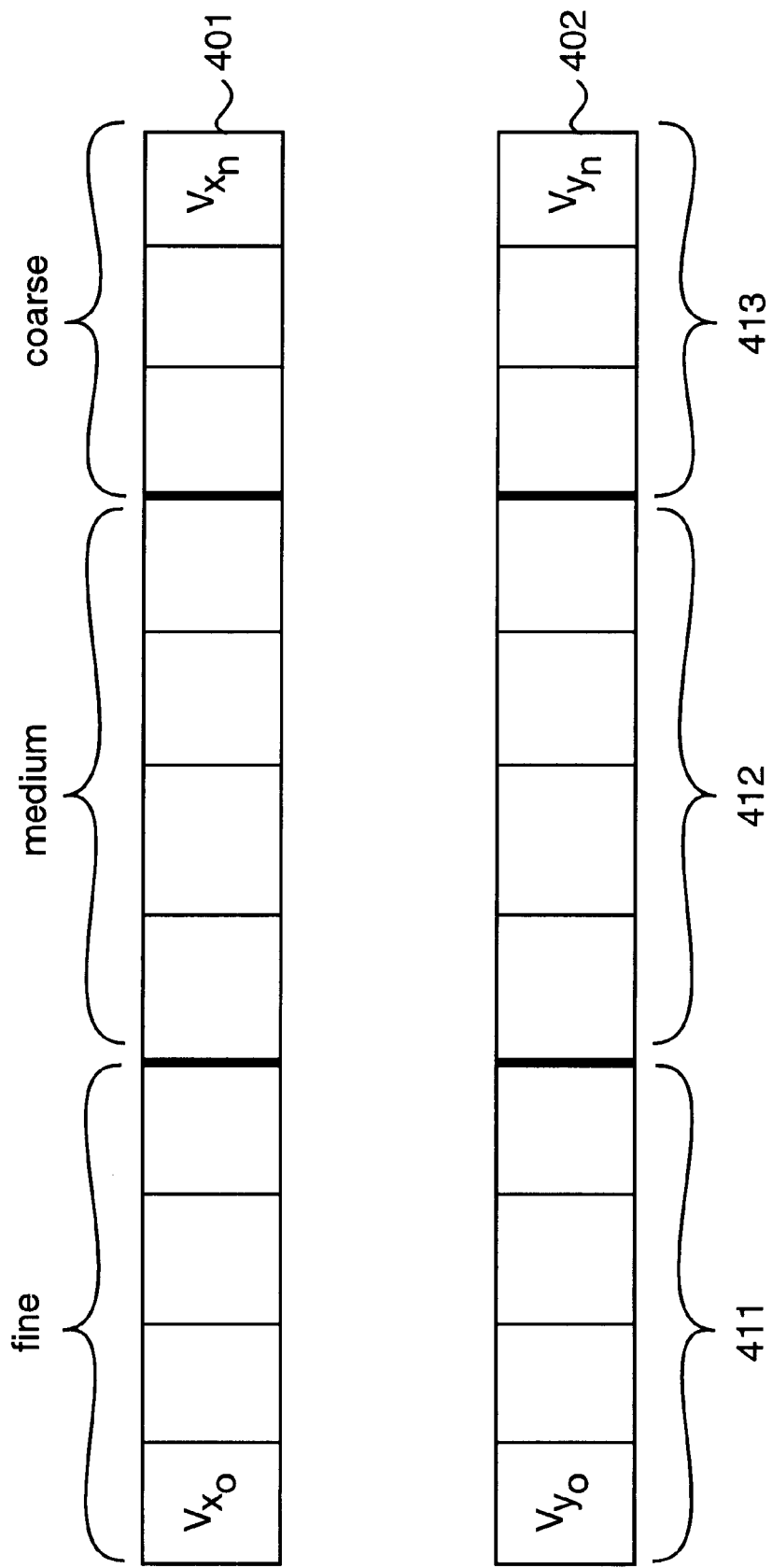
FIG. 4 is a graph of training data arranged in a sequential list.

The output of the training phase 110 is the training data 106. In a simple representation, as shown in FIG. 4, the pairs of low-dimensional vectors ($V_x$, and $V_y$) can be arranged as two sequential lists 401–402, one for the images 105 and the other for the scenes 106. In the lists, vectors for a specific resolution, e.g., fine 411, medium 412, and coarse 413 can be stored consecutively in groups.

Figure 5:
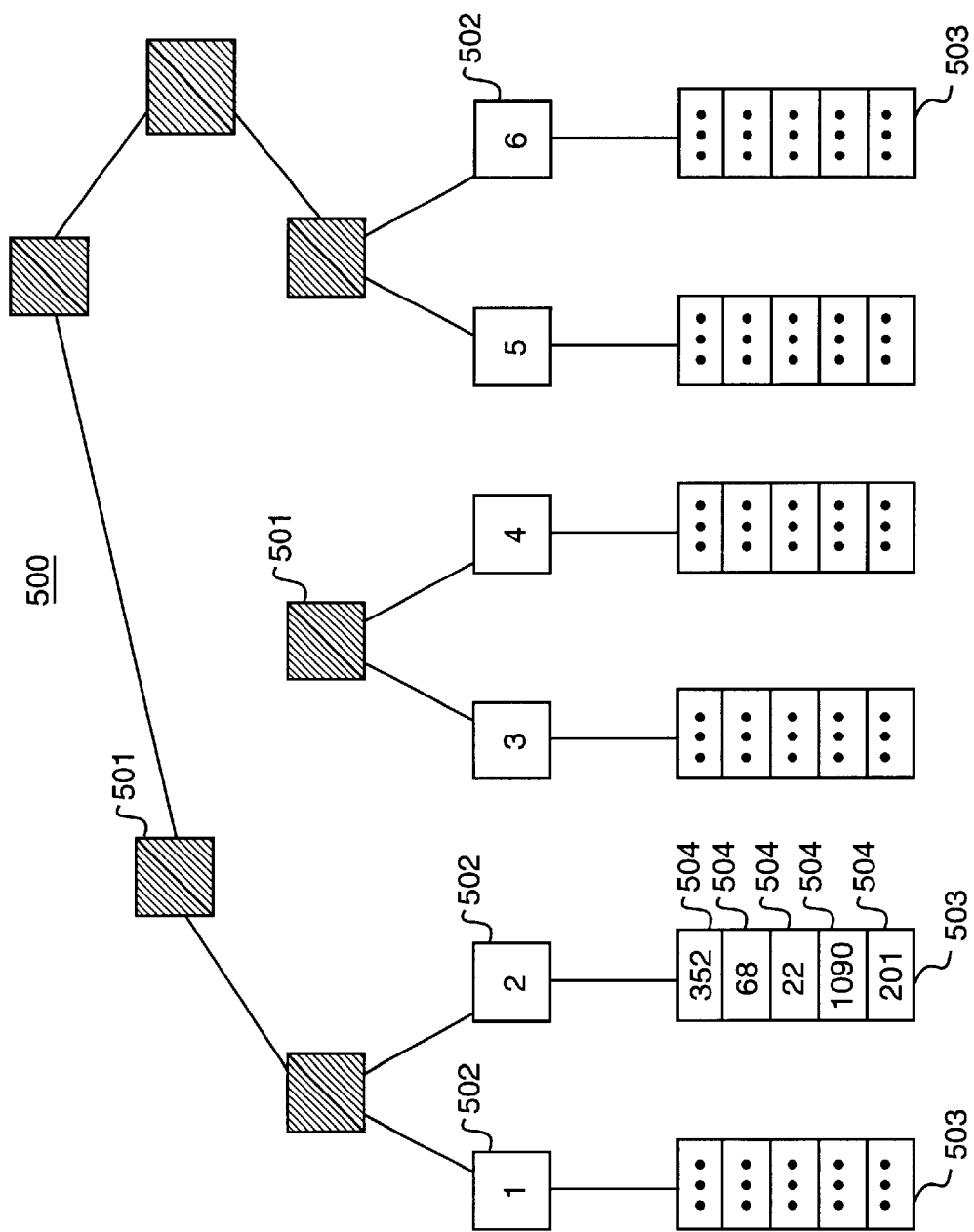
FIG. 5 is a graph of training data arranged in a binary tree.

As shown in FIG. 5, the training data 103 can also be arranged in a binary tree 500 to minimize search time. In the tree 500, the shaded nodes 501 are splitting hyperplane nodes. The bottom level index nodes (1, . . . , 6) 502 represent vectors $V_y$ for image patches. Each bottom level node 502 can index a pre-computed list 503 of pointers 504 of candidate scene vectors.

To find a candidate image patch vector that most resembles a given new image patch vector, during the inference phase 110, will take $\log_2(M)$ comparisons, where M is the number of training patches. If the training data are stored linearly as shown in FIG. 4, then finding the nearest image requires M comparisons.

As stated above, during training, we can pre-compute the list 503 of candidate scene patch vectors for each image patch vector. We store the candidates, for example twenty, as a list of pointers to the candidate scene patch vectors, along with each corresponding image patch vector 502. We also ensure that the list 503 includes many different representative scenes, perhaps at the cost of including scenes that do not closely represent the image in question. Thus, because of this pre-computation and using a tree structure, finding the candidate scenes only requires $\log_2(M)$ image comparisons.

After training, we infer the underlying scene 101 from the test image 102 using probability propagation in the inference phase.

Inference Phase

During inference, we infer a best estimate of the underlying unknown scene from the test image. For each patch of the test image, we search the training data to find a collection of candidates which best explain the observed image. We may select a fixed number N of candidates for each patch. In that case, we locate the N scenes from the training data which yielded the images closest in appearance to the observed image patch. For a distance metric to find the closest image patches, we can use a sum of squared or absolute value error difference. Alternative to selecting N scene samples, we may select all scene samples which yield images within some small epsilon (ε) distance of the observed image data.

From the training data, we establish two important probabilistic relationships.

First, we learn a local likelihood function. The local likelihood function characterizes possible images that correspond to a given scene. For example, an image of a tree can correspond to a forest scene.

Second, we learn compatibility functions. The compatibility functions indicate how neighboring "patches" relate to each other. A patch is some part or partition of a scene or an image.

In the prior art, as stated above, these two probabilistic relationships were represented with mixtures of Gaussian distributions. However, according to the present invention, the Gaussian mixture models are replaced with a discrete sample-based technique to improve the quality of the result, and to decrease the amount of time required to obtain the result.

Figure 6:
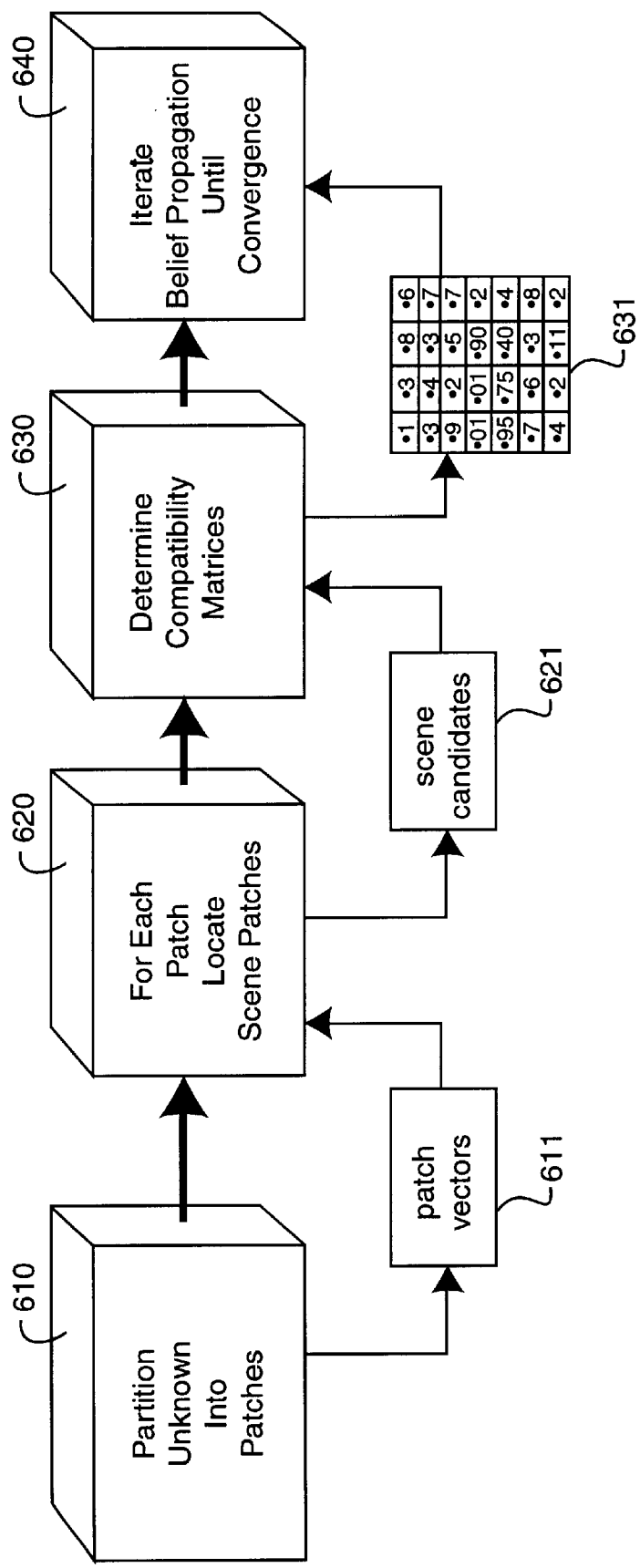
FIG. 6 is a flow diagram of an inference phase of the system of FIG. 1.

FIG. 6 shows the details of the inference phase 600. In step 610, the test image 10 to be analyzed is partitioned into patches, and low-dimensional vectors 611 are determined as described above for the training phase 110.

For each test image patch vector, we locate candidate scene patch vectors 621 that explain the image in step 620. This can be accomplished in log(M) comparisons when the training data 103 are arranged as the tree 500.

Step 630 determines compatibility matrices 631. Each compatibility matrix links candidates at two neighboring nodes. For example, if node $X_1$ of FIG. 3 has four candidates and node $X_2$ seven, then the matrix 631 is 4×7. The neighbor relationship can be with regard to variables, such as position, scale, or orientation. Finding the compatibility functions, according to the present invention, can be done by comparing the scene patches vectors themselves, avoiding the use of a mixture of Gaussians modeling step.

In step 640, we propagate the probabilities through the compatibility matrices until convergence, typically in fewer than ten iterations.

Using sample vectors, instead of Gaussian mixtures, the probability we determine is a probability for each of the scene candidates at each scene node in the Markov network. Typically, we set the scene 102 to be the candidate with the maximum probability as shown in FIG. 6. Alternately, we can fix one node's probability to be one for its maximum probability candidate, and zero for the others, then run probability propagation to let this certainty propagate to neighboring nodes.

Probability Propagation

While propagating probabilities, we can use either of two types of propagation rules.

First, a "sum-product" rule calculates the marginalized mean of a posterior probability for each node of the network 300, called the MMSE (minimum mean squared error) estimate. That is to say: given the test image 101, there is a conditional probability on a scene value that each node can take on. The mean of that conditional probability is the output of the sum-product probability propagation procedure at each node. The basic operations of the propagation procedure involve multiplying probability vectors together, term-by-term, and vector multiplying the terms by the linking compatibility matrices.

Second, a "max-product" propagation rule calculates the value of a variable which maximizes the posterior distribution, given the observed data. This is a maximum a posteriori (MAP) estimate of the scene parameters.

Both the sum-product and the max-product rules are exact for a network without loops. It is known for a network with loops that: (1) the sum-product rule gives the exact mean for Gaussian random variables, and (2) the max-product rule, if it converges, converges to at least a local maximum of the posterior probability.

The probability propagation calculation involves a local likelihood function, $P(y_i|x_i)$, and scene compatibility functions, $\Phi(x_i, x_j)$, where $x_i$ and $y_i$ denote respectively scene and image variables at node i. Between an image node, $Y_i$, and a scene node, $X_i$, the message passed is $m_{YiXi}(x_i) = P(y_i|x_i)$. Between two scene nodes, $X_i$ and $X_j$, we have $\Phi X_{XiXj}(x_i, x_j)$ for the compatibility matrix.

Using superscripts to indicate iteration number, the probability update, or "sum-product" update rules are:

$$m^{l+1}{}_{XiXj}(x_j) \leftarrow \alpha \int_{xi} \Phi_{XiXj}(x_i, x_j) \Pi_{k \in N(i)\backslash j} m^l{}_{XkXi}(x_i) \qquad [\text{Eq. 1}]$$

$$b^l{}_{Xi}(x_i) \leftarrow \alpha \Pi_{k \in N(i)} m^l{}_{XkXi\}}(x_i) \qquad [\text{Eq. 2}]$$

where α denotes a normalization constant, and N(i)\j means all nodes neighboring node $X_i$, except node $X_j$, the node receiving the propagated probability. The initial messages are uniform, i.e., all ones.

The max-product rule changes the above integration to a maximization. For example, at iteration 0, an initial probability at node $X_1$ is:

$$b^0{}_{X1}(x_1) = \alpha \Pi_{k \in N(1)} m^0{}_{XkX1}(x_1) = P(y_1|x_1),$$

because all initial messages are uniform, except for the message from the local image data. The message at iteration 1 that any scene node $X_i$ passes to a neighboring node $X_j$ is:

$$m^1{}_{XiXj}(x_j) = \alpha \int_{xi} \Phi_{XiXj}(x_i, x_j) \Pi_{k \in N(i)\backslash 2} m^0{}_{XkX1}(x_i)$$

$$= \alpha \int_{xi} \Phi_{XiXj}(x_i, x_j) P(y_i|x_i).$$

Local Likelihood Function

The local likelihood function, $P(y|x)$ is the probability of the observation, given the scene patch in question. For convenience, we assume Gaussian random noise on the observations, and use $P(y|x_0) = \exp(-|y-y_0|^2/(2\sigma_1^2))$, where $y_0$ is the true image associated with the scene patch $x_0$, and y is the image data for which we want to examine the likelihood of $x_0$, and $\sigma_1$ is a parameter controlling how precisely the inferred scene explains the observation.

Scene Compatibility Functions

Rather than measure co-occurrence probabilities between pairs of scenes, we find it easier to exploit the physical properties of the scenes themselves. We make the patches have overlapping samples, and penalize the difference in the sample values for the corresponding samples in a quadratic sum-of-squares way. Thus, for the compatibility function between scene nodes 1 and 0:

$$\Phi(x_1, x_0) = \exp(-\|[x_1]_d - [x_0]_d\|^2/(2\sigma_2^2)),$$

where $[x_1]_d$ and $[x_0]_d$ mean the parts of $x_1$ and $x_0$ that overlap each other, and $\sigma_2$ is a parameter controlling the strength of the influence of one node on its neighbor. Both the compatibility and local likelihood functions can use L-1 norms, or other norms as desired. For example, an L-1 norm (sum of absolute-value differences) can be:

$$\Phi(x_1, x_0) = \exp(-\|[x_1]_d - [x_0]_d\|/(2\ \sigma_2)).$$

Example Propagation

FIGS. 7a–e shows how probabilities for a set of candidates are modified over time. The candidates and probabilities are for a one-dimensional shape-from-shading application showing candidates for image data, and the winnowing out of incompatible solutions. In these Figures, the y-axis indicates the intensity value, and the x-axis the relative distance across the image.

Figure 7:
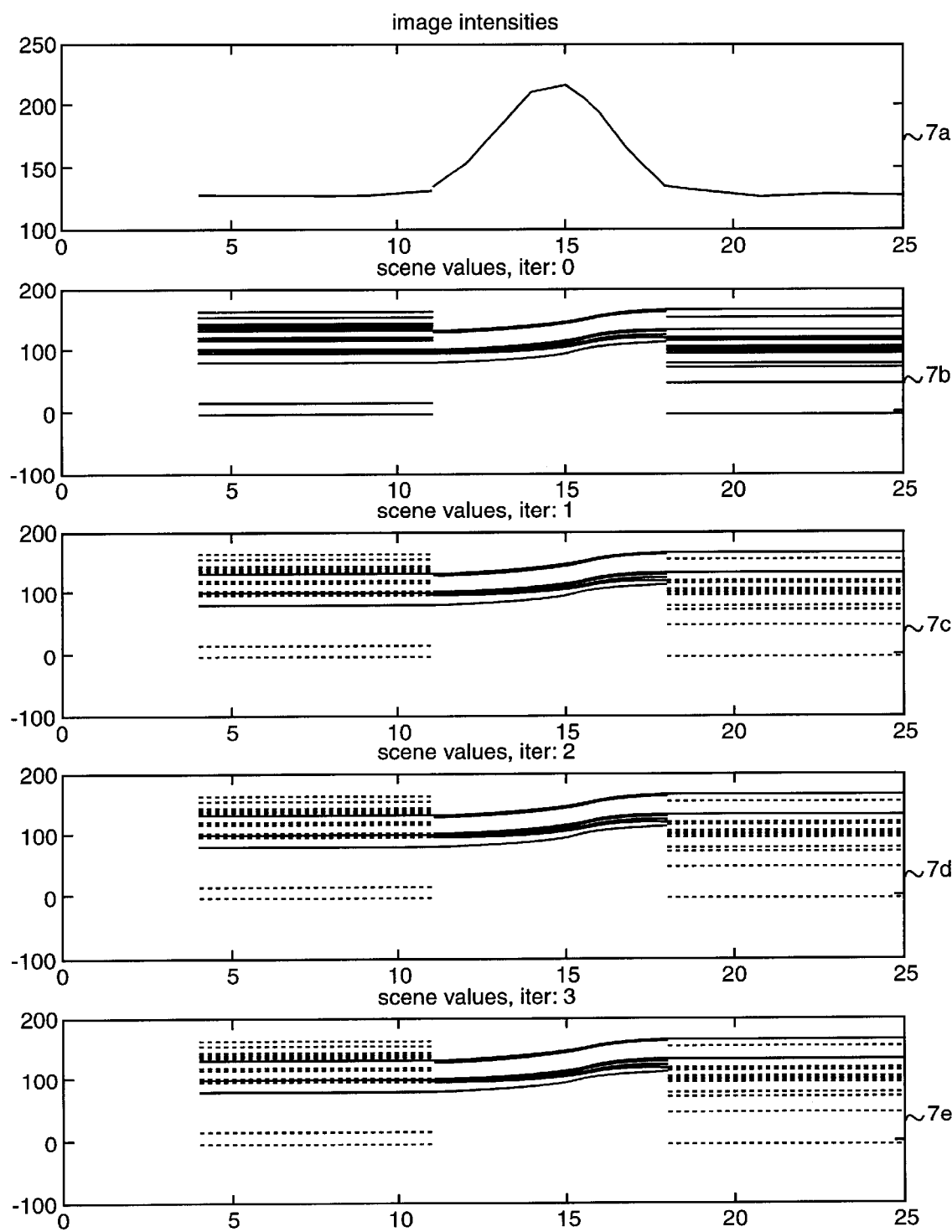
FIGS. 7a–e are graphs indicating how probabilities for a set of scene candidates are modified over time.

FIG. 7a shows image intensity data, for the left edge of a "bump" in a surface lit from the left. FIGS. 7b–e show respectively four plots for three adjacent candidate patch shapes to explain the image data.

In this example, at the $0^{th}$ iteration, all the scene candidates which explain the image data are given equal weight. Scene explanations (light shading) which do not fit together at their borders have low compatibility function values, resulting in low probabilities after the probability propagation. After just a few iterations, only two, equally good scene explanations survive (dark shading).

Loss Function

This section describes a consideration that is important for some inference applications, for example, in an application that infers scene shape and reflectance parameters from a test image. For a scene parameter x, a loss function L(x, x') specifies the penalty for estimating x' when the true scene parameter is x. The loss function leads to a rule for estimating the scene parameters from the posterior probability expressed as: choose the scene parameters that minimize the expected loss.

A maximum a posteriori (MAP) decision rule assumes that:

$$L(x, x')=-\delta(x-x'),$$

which we call the minus delta loss function, where $\delta$ is the Dirac delta function. The minimum mean square error (MMSE) rule assumes a squared error loss function expressed as:

$$L(x, x')=(x-x')^2.$$

For many applications, both the MAP and the MMSE estimates give good results. But for some applications, such as shading and reflectance estimation applications, the loss function can impact the final estimate. If we apply the sum-product probability propagation rule, it leads to a MMSE estimate. The max-product rule leads to the MAP estimate. Below, we describe how to modify the local likelihood function so that applying the max-product rule using the modified likelihoods leads to a local minimum of the expected loss for a different loss function than with the MAP or MMSE estimate.

A more desirable loss function to use for the shading/reflectance application is one where any lighting direction estimate relatively near the true direction is rewarded equally, and estimates much further away are penalized with a saturating penalty.

To find the optimal scene estimate for a given loss function, we blur-out the posterior probability by the loss-function to be used, then find the minimum of the result:

$$\text{expected loss}=\int[\text{likelihood}][\text{prior}][\text{loss function}]d[\text{parameters}]$$

$$R(x'|y)=\int P(y|x)P(x)L(x, x')dx$$

If the prior probability over scene parameters varies much more slowly than the size of the loss function, then we can blur-out the local likelihood function by the loss function before applying the prior probability. We say that the prior is constant over the part of the integral where the loss function changes, or:

$$\text{expected loss}\approx[\text{prior}]\int[\text{likelihood}][\text{loss function}]d[\text{parameters}]$$

$$R(x'|y)=P(x)\int P(y|x)L(x, x')dx$$

Thus, in the probability propagation machinery, we need to substitute the blurred local likelihood function for the actual one, then run the usual max-product probability propagation rules, in order to find a local minimum of the expected loss function.

Applications

In one application of our invention, we estimate high-resolution details from a blurred, or lower-resolution image. In this application, the image data are the image intensities of the low-resolution image, and the "scene" data are the image intensities of the high-resolution details.

We obtain our training images and scenes starting from a collection of digitized, high resolution pictures. We obtain a bandpassed version of that high resolution picture by applying a bandpass spatial filter. We apply a spatially varying multiplicative local gain control factor to this bandpassed image. The gain control factor is computed as the square root of the squared and blurred value of the bandpass filtered image. This contrast gain control normalizes the contrast of edges, easing the burden on subsequent modeling steps. The resulting contrast-normalized, bandpassed picture represents the "image" information.

We obtain the corresponding "scene" information by high-pass filtering the corresponding high-resolution picture, and then applying the same spatially varying local gain control factor that was computed from the bandpassed image. The result represents the corresponding target or "scene" information.

We generate many such image and scene pairs to build the training data. We partition each image and scene pair into patches in a uniform gridwork at a single spatial scale. We represent each image patch and each scene patch by a vector, derived from a PCA analysis of the training set.

For a new, low-resolution, test image, we first linearly interpolate the image to a higher pixel resolution. Then we apply the bandpass filter and local contrast normalization to the interpolated image. This generates the input "image" information. We partition this image up into patches and vectors representing each patch, as with the training data.

From the training samples, we search for the twenty nearest image examples to each patch of the new image. The corresponding scenes for those twenty examples are the scene candidates at each patch. Each patch is a node in the network. We compute the likelihood for each scene candidate and the compatibility functions between scene candidates at neighboring nodes in the network. We apply probability propagation to estimate the high-resolution scene at each node, taken to be the scene candidate with the maximum probability at each node.

We then reconstruct the scene patches from the scene vectors, using the PCA basis functions. We then divide by the contrast normalization factor at each point in the image, to undo the contrast normalization. Adding that result to the interpolated image without contrast normalization yields a full-bandwidth, improved picture, utilizing the high frequency information that was inferred during probability propagation.

In an application for disambiguating shading and reflectance information, the image is a picture. The scene is a set of intrinsic images showing reflectance values and surface heights at every point, and some description of the overall lighting.

In an application which estimates optical flow from an image sequence, the image is two temporally adjacent frames of a video. The scene is the projected velocities of objects depicted in the video.

In a volume graphics application, the invention can be used for inference, analysis, enhancement and/or compression of 3D volumetric data sets, such as in medical imagery, MRI, CAT, etc.

In an application which estimates three-dimensional body motion from a sequence of two-dimensional images in a video, the image is a video of a moving body, and the scene is the three-dimensional motion parameters of the moving body.

In a movement translation application, the image is three-dimensional motion capture data of the object moving in the particular manner. For example, the motion capture data of a person dancing a choreography in an awkward or amateurish style. The scene is three-dimensional motion capture data of an artist or professional dancer performing the same choreography.

In an audio enhancement application, the image is low grade audio data, for example, a conversion on a low-grade telephone line. Here, the underlying "scene" is the corresponding full-quality audio data.

In a compression application, the test image is highly compressed data with many compression artifacts due to the "lossy" compression. The underlying "scene" to be inferred is the original, pre-compressed data minus compression artifacts. Thus, it is possible to recover better quality data for a given level of compression.

Training for Multiple Classes of Images

In an alternative embodiment, the invention can also be used to train for a variety of different classes of images. For example, in a super-resolution application, it is possible to train for a class of images representing faces, and buildings, and trees, and flowers. Switching between different training sets is performed by including a class label with the scene data. We define a class compatibility function, $\psi(c_i, c_j)$ which indicates how likely a scene sample from class $c_1$ borders a scene sample from class $c_2$. In this case, $\psi(c_i, c_i)$ is 1, and $\psi(c_i, c_j)$ is less than one, for $i \neq j$. The scene sample compatibility function, or the linking matrix, is:

$$M_{Xi,Xj}(x_i, x_j) = \Phi(x_i, x_j)\psi(c_i, c_j),$$

where $c_i$ and $c_j$ are the respective classes of $x_i$ and $x_j$.

For example, in the middle of some region of an image are flowers, it might be the case that a sample from a building scene happens to explain the flower image data, and connect with the neighboring scene samples better than any of the samples from the flower training database. But the class compatibility preference might win-out over the likelihood and prior terms, and force the system to use a sample from the flower database. The hope is that such a choice leads to, for example, a more flower-like estimated high resolution image.

In this description of the invention, we used specific terms and examples. It is to be understood that various other adaptations and modifications may be made within the spirit and scope of the invention. Therefore, it is the object of the appended claims to cover all such variations and modifications as come within the true spirit and scope of the invention.

We claim:

1. A method for inferring a scene from a test image, comprising the steps of:
   acquiring a plurality of images and corresponding scenes;
   representing each image as a set of image vectors and each scene as a set of scene vectors;
   modeling the image vectors and scene vectors as a network;
   acquiring the test image;
   representing the test image as a test set of vectors;
   identifying candidate scene vectors corresponding to the test image vectors in the network;
   determining compatibility matrices for the candidate scene vectors; and
   propagating probabilities of the candidate scene vectors to infer the scene from the test image.

2. The method of claim 1 wherein the images, the scenes, and the test image are visual data.

3. The method of claim 1 wherein the images, the scenes, and the test image are audio data.

4. The method of claim 1 wherein the images and the scenes, and the test image are synthetically generated.

5. The method of claim 1 wherein the images and the scene are measured.

6. The method of claim 1 wherein there is a one-to-one correspondence between the images and the scenes.

7. The method of claim 1 wherein each of the image, scene, and test image is respectively partitioned into a plurality of image, scene, and test image patches.

8. The method of claim 1 wherein the vectors are low-dimensional vectors determined by principal component analysis.

9. The method of claim 8 wherein the dimensionality of the vectors is less than ten.

10. The method of claim 1 wherein the network is a Markov network having nodes and edges, and wherein the nodes represent the vectors and the edges represent statistical dependencies between the vectors.

11. The method of claim 1 wherein the network is multi-resolution.

12. The method of claim 1 further comprising the steps of determining local likelihood functions for the candidate scene vectors, and determining compatibility functions to indicate how neighboring vectors are probabilistically related to each other.

13. The method of claim 10 wherein a sum-product rule determines a marginalized mean of a posterior probability for each node of the network.

14. The method of claim 10 wherein a max-product determines a value of a variable which maximizes the posterior probability for each node.

15. The method of claim 12 wherein a loss function is used to modify the local likelihood functions.

16. The method of claim 1 wherein the test image is low-resolution, and the inferred scene is high-resolution.

17. The method of claim 1 wherein the test image is a picture, and the inferred scene is a set of intrinsic images having reflectance values and surface heights, and a description of overall lighting.

18. The method of claim 1 wherein the test image is a video of a moving body, and the inferred scene is a set of three-dimensional motion parameters of the moving body.

19. The method of claim 1 wherein the test image is a first video of a moving object, and the inferred scene is a second video of a second moving object moving according to the first moving object.

20. The method of claim 1 wherein the image vectors and scene vectors comprise training data arranged as a binary tree.

21. The method of claim 20 wherein the candidate scene vectors are precomputed at index nodes in the binary tree.

22. The method of claim 1 wherein the images and scenes are organized as a plurality of classes, each image and scene having a corresponding class label c.

23. The method of claim 22 wherein a class compatibility function $\psi(c_i, c_j)$ indicates a likelihood that a scene from class $c_1$ borders a scene from class $c_j$ such that $\psi(c_i, c_i)$ is 1, and $\psi(c_i, c_j)$ is less than one, for $i \neq j$.

24. The method of claim 23 wherein a scene compatibility function is:

$$M_{x_i,x_j}(x_i,x_j)=\Phi(x_i,x_j)\psi(c_i, c_j),$$

where $c_i$ and $c_j$ are respective classes of scene $x_i$ and scene $x_j$.

25. The method of claim 1 wherein the propagating probabilities of the candidate scene vectors are propagated until a termination condition is reached.

* * * * *